Sept. 3, 1935.  R. J. S. PIGOTT  2,013,252
FLUID PRESSURE TEST GAUGE
Filed Aug. 22, 1932   3 Sheets-Sheet 1
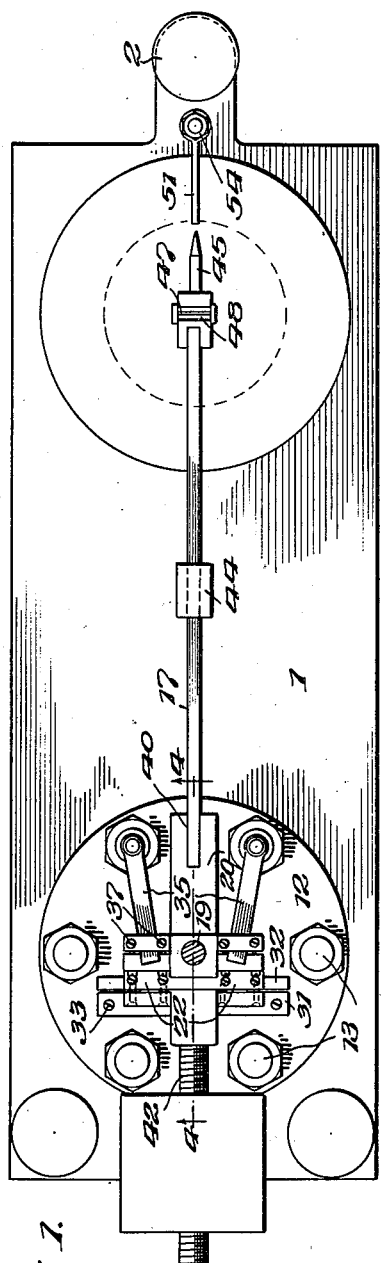
Inventor
Reginald J. S. Pigott,
By G. M. Houghton.
Attorney Sept. 3, 1935.  R. J. S. PIGOTT  2,013,252
FLUID PRESSURE TEST GAUGE
Filed Aug. 22, 1932  3 Sheets-Sheet 2
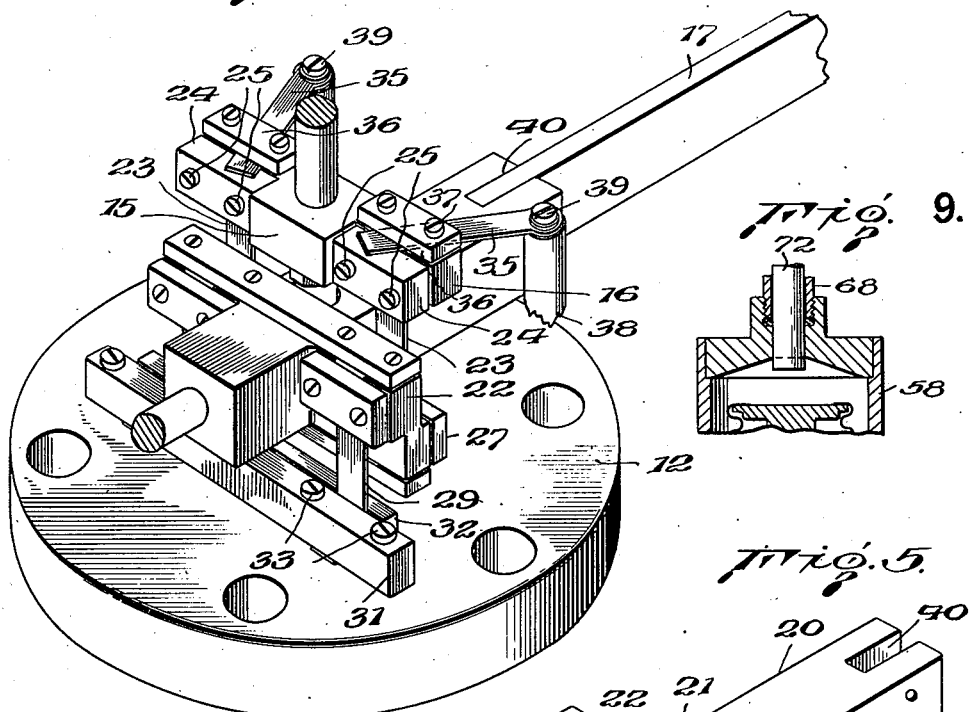
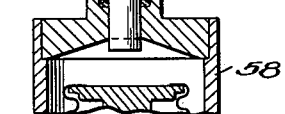
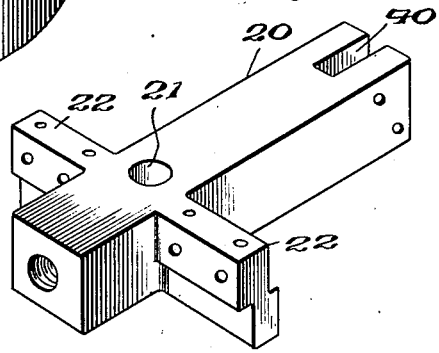
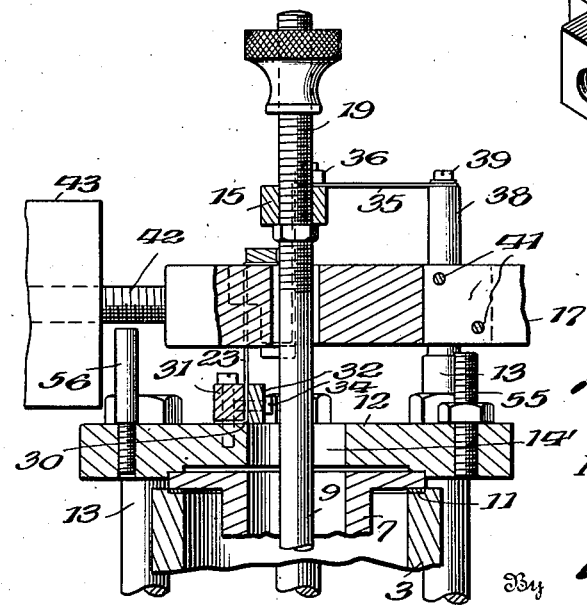
Inventor
Reginald J. S. Pigott,
By A. M. Houghton
Attorney Sept. 3, 1935.  R. J. S. PIGOTT  2,013,252
FLUID PRESSURE TEST GAUGE
Filed Aug. 22, 1932  3 Sheets-Sheet 3
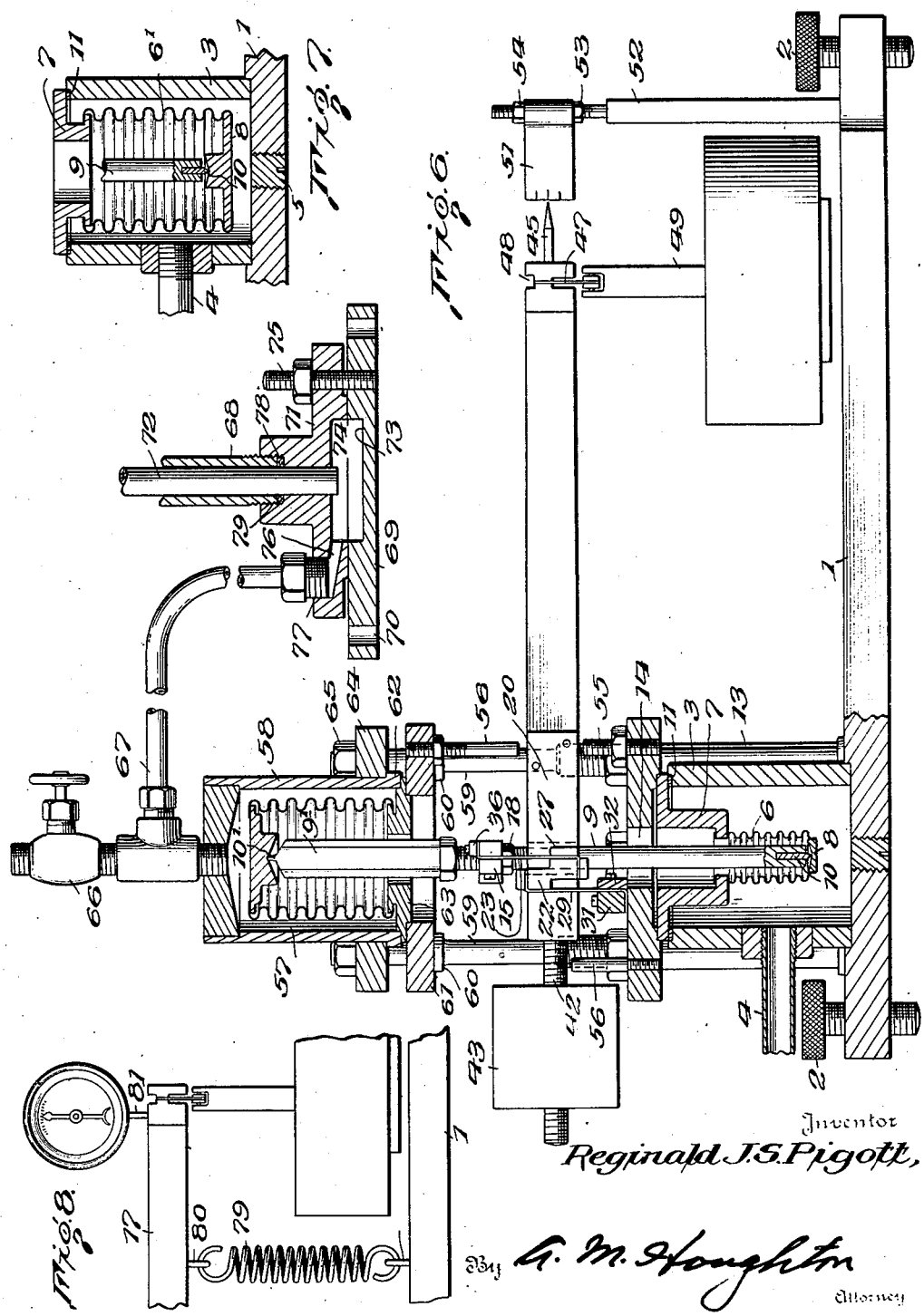

Patented Sept. 3, 1935

2,013,252

UNITED STATES PATENT OFFICE 2,013,252

FLUID PRESSURE TEST GAUGE

Reginald J. S. Pigott, Pittsburgh, Pa., assignor, by mesne assignments, to Gulf Research & Development Corporation, Pittsburgh, Pa., a corporation of Delaware Application August 22, 1932, Serial No. 629,979

12 Claims. (Cl. 73—110)

This invention relates to fluid pressure test gauges, and it comprises such a gauge having a chamber in communication with a source of fluid, the pressure of which is to be measured, a pressure responsive element comprising a bellows in the chamber, one end of the bellows being fixed and open to the atmosphere and the other end adapted for movement and carrying a movement post, a beam or lever actuated by the movement post, the beam being adjustably suspended from the movement post and secured thereto and to the top of the pressure chamber by means of steel tapes, a rider, weight pan, and indicating needle, carried on one arm of the beam and an adjustable counter weight carried on the other arm, means for maintaining substantially, axial movement of the movement post comprising a flexible member secured to the movement post and to a stationary portion of the gauge and means, in addition to or taking the place of the rider on the beam, for balancing the beam, said means comprising a column of mercury or an auxiliary spring and beam displacement dial indicator, all as more fully hereinafter set forth and as claimed.

Fluid pressures are usually measured with a Bourdon gauge. This consists simply of a curved tube closed at one end and adapted to receive the pressure of the fluid to be measured at the other end. The closed end operating through a system of levers or gears swings a pointer against a graduated dial to indicate the pressure of the fluid. For measuring high pressures a stronger thicker and heavier tube must be used than for measuring low pressures. Since operation of the gauge is dependent upon the tendency of the tube to bend and to straighten itself when fluid pressure is applied internally, a tube of much greater stiffness must be used for measuring pressures of say 2500 pounds per square inch than for measuring pressures of say 15 pounds per square inch. The range of pressures from 15 to 2500 pounds is measured usually by some 16 separate gauges calibrated for maximum pressures as follows: 15, 30, 60, 100, 150, 200, 250, 300, 400, 500, 600, 800, 1000, 1500, 2000 and 2500 pounds respectively. A further disadvantage of the Bourdon type of gauge is that the stiffness of the tube cannot be precisely known until after it is made. The stiffness varies frequently as much as plus or minus 10 per cent of the maximum pressure reading of the gauge. Adjustment for this error is sometimes taken care of by a slide on the sector arm of the gauge. A further source of error apparent in a Bourdon gauge is in the lever system necessary to multiply the movements of the tube to give appreciable swing to the indicator hand. The movement of an ordinary brass Bourdon tube for measuring pressures up to 1000 pounds is only about $\frac{1}{16}$ of an inch and of a steel hydraulic tube about $\frac{1}{32}$ of an inch while the indicator hand must travel through an arc of approximately 270°. The smallest play between the moving parts of the lever system results in an inaccurately reading gauge. Because of these disadvantages the Bourdon type of gauge is not satisfactory where pressure must be determined with great precision. Especially are they unsatisfactory for use as a standard test gauge, by comparison with which, other gauges are tested and calibrated.

Pressure responsive bellows have also been used for measuring fluid pressures, but never so far as I am aware have they been used in combination with a scale beam and an automatic beam balancing arrangement using a column of mercury or small auxiliary spring and dial indicator for indicating small pressure displacements of the beam.

Among the objects of the present invention are the provision of a fluid pressure gauge adapted to accurately measure fluid pressure; the provision of a standard test gauge using, in combination, a fluid pressure responsive bellows and a scale beam; the provision of means in place of the usual rider for balancing the beam; the provision of a graduated mercury column or an auxiliary spring and a dial indicator for balancing the beam, the column of mercury and the dial indicator accurately indicating small pressure displacements of the beam; and the provision of a sensitive, accurately reading gauge of rugged construction, consisting of a relatively small number of parts and having no play between the moving parts while capable of measuring pressures of a wide range.

I have accomplished these objects by providing a pressure gauge with a bellows such as a sylphon or corrugated bellows positioned in a pressure chamber, the chamber being adapted to receive the pressure of the fluid to be measured. One end of the bellows is fixed to the chamber and open to the atmosphere while the other end is closed and carries a movement post. Fluid pressure is advantageously applied externally of the bellows, since bending or curving is more apt to occur when pressure is applied internally. The sylphon or corrugated bellows gives an exactly linear response to the pressure applied, having through its range of elasticity uniformly equal increments of movement for equal pressure increments.

Suspended from a cross bar on the movement post is a scale beam provided with the usual pointer and weight pan at the end of its long arm and having an adjustable counterweight on its short arm. A short distance to the rear of the point of suspension of the beam and connecting the beam with the top of the pressure chamber is arranged a pair of fulcrum tapes; that is flexible supporting members of small thickness in at least one dimension. Cooperating with the pointer on the beam is a stationary scale graduated to indicate the horizontal position of the beam. This scale together with the pressure chamber is mounted on a base and the base provided with leveling screws. Adjustable stops limiting the upward and downward swing of the beam are also provided and these may be secured to the top of the pressure chamber or to the base of the gauge. For ordinary measuring of pressures weights placed upon the weight pan serve as a direct measure of the pressure and a rider is provided on the scale beam to balance the beam, but for precision measuring I advantageously use a column of mercury or an auxiliary spring and dial indicator to measure residual pressure reflected in displacement of the scale beam from the zero point. When a column of mercury is used I provide a second bellows positioned in a displacement chamber arranged above the beam. This bellows is adapted to be actuated by an extension of the movement post. The displacement chamber may be filled with oil and communicate with a small reservoir of mercury at the base of the mercury column, or preferably the displacement chamber itself may be filled with mercury and the mercury column mounted directly on top of and in direct communication with this chamber. The column or tube containing the mercury is made of glass and graduated so that the level of the mercury may be ascertained. Oil or mercury, displaced from the displacement chamber due to elongation of the bellows by the movement post, causes the level of the mercury in the tube to rise. When an auxiliary spring and dial indicator are used the spring is positioned near the end of the long arm of the beam and connects the beam with the base of the gauge. The dial indicator rests with its feeler on the beam and when the beam is in a horizontal position it reads zero. Both the mercury column and the auxiliary spring and dial indicator, besides taking the place of the adjustable weight normally provided by the rider, also serve to multiply indication of the movements of the beam and to give a more accurately reading gauge. Knife edges may be used in place of the thin steel tapes if desired. In the displacement of the scale beam from the horizontal in the movement of the mercury column and in the deflection of the auxiliary spring and dial indicator, the straight line relation of the bellows movement to the pressure causing the movement is preserved.

Use of the thin steel tapes described is particularly advantageous, partly for the reason that they are for all practical purposes, free of frictional resistance; and partly for the reason that because of their compactness they allow a greater lever arm ratio, that is a greater movement multiplication than is possible with other types of supporting means. Lever multiplication of 100 to 1 or greater can readily be obtained with the fulcrum tape construction.

In the accompanying drawings showing several forms of a specific embodiment of my invention:

Fig. 1 is a top plan view of the gauge and shows the beam and arrangement of the movement post guide members;

Fig. 2 is a side elevation partly in section and shows arrangement of the bellows within the pressure chamber;

Fig. 3 is a detail perspective view of the mechanism on top of the pressure chamber and illustrates the fulcrum support for the beam;

Fig. 4 is a detail sectional view taken along line 4—4 of Fig. 1 looking in the direction of the arrows;

Fig. 5 is a detail perspective view of a portion of the beam and shows the Z shaped side supports to which the fulcrum tapes are connected;

Fig. 6 is a side view partly in section of a modified form of the gauge shown in Fig. 1, showing a displacement chamber mounted above the beam and connected with a mercury column for indicating displacements of the beam;

Fig. 7 is a detail sectional view showing the pressure chamber in vertical section and illustrating the use of a large bellows where small pressures are to be measured;

Fig. 8 is a detail elevation showing a modified form of beam displacement measuring mechanism; and, Fig. 9 is a fragmentary view in section showing the mercury column mounted directly on top of the displacement chamber.

Referring to the drawings throughout the several views of which like numerals indicate corresponding parts, 1 is the base of the gauge provided with leveling screws 2 for properly positioning the gauge when a test is to be made. Numeral 3 represents a vertical, cylindrical pressure chamber mounted on the base near one end. A pipe 4 communicates with the chamber and is arranged for connection with the source of fluid the pressure of which is to be measured. Plug 5 in the bottom of the chamber permits withdrawal of liquid from the chamber as presently described. Positioned within the chamber is a bellows 6 one end of which is secured to the top 7 of the chamber, and open to the atmosphere. The other end of the bellows is closed by a hard metallic block 8 machined on its inner face to provide a suitable point-contact bearing surface for the reception of one end of a vertically disposed movement post 9. The end of the movement post extending into the bellows is provided with a hard metallic insert 10 protruding slightly therefrom and pointed to seat on the machined face of block 8. The bellows is advantageously of the sylphon type but any suitable strong, impervious type of bellows may be used. The top 7 of chamber 3 is provided with gasket 11 and is held in position by means of a face plate 12 bolted to the base by bolts 13 spaced at intervals about the circumference of the plate. The movement post extends through opening 14 in the face plate and, at a suitable distance above the plate it is provided with a block 15 having diametrically opposite, horizontally extending arms 16 from which a scale beam 17 is suspended. Block 15 is adjustable longitudinally of the movement post and held in position by means of nut 18 engaging threads 19 on the post. Scale beam 17 is provided at its point of suspension with a cross shaped member 20 shown in perspective in Fig. 5 of the drawings. As shown, this member is provided with an opening 21 extending therethrough for the reception of the movement post. The arms 22 of the cross are Z shaped in cross section. The cross is disposed horizontally above the face plate of the pressure chamber but beneath the supporting arms 16 of block 15; the arms of the cross and the supporting arms of the block lying in substantially vertical planes. Steel tapes 23 by which the cross is suspended from the arms 16 are secured to the arms by means of clamping blocks 26 and bolts 25. At their lower extremities the tapes are bent at right angles as shown at 26 and held against one side and the bottom of the Z shaped cross arms 22 by means of clamping blocks 27 secured to the arms by bolts 28. Fulcrum tapes 29 bent at right angles as shown at 30 are secured to the other side of the Z shaped cross arms and extend downwardly and are fastened to face plate 12 by means of blocks 31 and 32; the tapes passing under block 31 which is bolted to the face plate by bolts 33. The fulcra formed by tapes 23 and 29 are relatively close together as shown. Clamping block 32, securely holds the tapes against the side of block 31 by means of the screws 34. In order that the movement post shall have substantially vertical movement, guides 35 positioned at either side of the scale beam 17 are provided. These guides may be simply flat strips of metal fastened at one end to the supporting arms 16 of block 15 by means of clamping blocks 36 and bolts 37 and secured at the other end to the top of face plate bolt extensions 38 by means of screws 39. Scale beam 17 fits into the bifurcated end 40 of the cross shaped member 20 and is fastened thereto by any suitable means such as rivets 41. At the other end of member 20 and positioned diametrically opposite the scale beam is a threaded extension 42 carrying weight 43 adjustable longitudinally thereon. Scale beam 17 is graduated and provided with the usual rider 44, pointer 45 and weight pan 46. Weight pan 46 is hung from the end of the beam by a link 47 fitting in notch 48 on the beam and is secured to a pan supporting arm 49 through pivot joint 50. The arrangement of the link and the pivot constitutes a universal joint between the pan and the beam, allowing freedom of movement, in any direction, of the weights and the scale pan with respect to the movement of the beam. Stationary scale 51, cooperating with pointer 45 for indicating displacements of the beam, is adjustably supported on a threaded portion of standard 52 secured to the base of the gauge. Pointer 45 reflects in magnified degree the movement of movement post 9. Adjustment of scale 51 is accomplished by means of nuts 53 and 54. Adjustable stops 55 and 56 secured to the face plate 12 immediately beneath the scale beam are positioned one on each side of the fulcrum of the beam and are provided for the purpose of preventing exaggerated movements of the beam such as might damage the gauge.

As so far described the gauge is operated as follows; the gauge is first leveled by means of screws 2, and the beam brought to a horizontal position as indicated by pointer 45 on scale 51. This may be accomplished by suitable adjustment of weight 43. Or it can be done by adjusting the vertical position of hanger block 15 by means of nut 18, as described ante. Fluid under pressure is then admitted to chamber 3 through pipe 4 and surrounds the bellows and causes it to contract or collapse in an endwise direction, much the same as a piston in a cylinder. This movement is imparted to the movement post and through tapes 23 to the beam, to swing the pointer carried by the beam above the horizontal graduation on the scale 51. Weights are then applied to the weight pan until the pointer is lowered nearly to the horizontal. Rider 44 is then shifted along beam 17 to finally bring the pointer to the zero or horizontal mark on the scale. At this time the pressure measured will be represented by the sum of the weights on the weight pan plus the weight equivalent of the rider as indicated by its position on the beam.

In place of the rider there may be provided a structure such as shown in Fig. 6 where the beam is balanced or its displacement measured by means of a column of mercury. Referring to Fig. 6, movement post 9 is provided with an extension 9' whose pointed upper end 10' sets in a recess at the free end of a second bellows 57. Bellows 57 is mounted in displacement chamber 58 supported by extensions 59 of face plate bolts 13. These extensions are provided with shoulders 60 upon which rest face plate 61 of the displacement chamber. Chamber 58 is flanged as shown at 62 to receive a cover 63 to which the fixed end of bellows 57 is secured. In this modification the upper bellows (57) with its recessed upper end engaging point 10' of movement post extension 9' on movement post 9, cooperates with the lower bellows (which engages the lower end of movement post 9) to restrain the movement of post 9 to straight line motion. Hence supporting means 35, 38 can be omitted in this structure; as appears in Fig. 6. Surrounding chamber 58 and engaging the outside of flange 62 is a collar or coupling 64 through which bolt extensions 59 pass, the extensions being provided with nuts 65 for clamping the chamber and its cover against the face plate. At the top of chamber 58 is a T pipe connection, one arm of which is fitted with a valve 66 and the other arm with a pipe 67 communicating with a mercury column apparatus consisting essentially of a base portion 69 having means such as openings 70 for attachment to a support, a top portion 71 and a glass tube 72 inserted therethrough. Base 69 is centrally recessed as at 73 such recess coacting with a corresponding recess in top portion 71 to form a chamber 74 providing a mercury reservoir. Top portion 71 is secured to the base by means of bolts such as bolts 75. Communicating with chamber 74 is a passageway 76 terminating in a threaded pipe connection 77 receiving pipe 67 from the displacement chamber. Also communicating with chamber 74 and extending vertically therefrom is the glass tube 72. Suitable connection of the tube with the top portion 71 is provided such as threaded collar 68 surrounding the tube, threaded opening 79 in the top portion for the reception of the collar and packing 78. Tube 72 has a relatively small bore and is adapted to receive mercury from chamber 74. In certain cases the arrangement of reservoir 74 and the connection of pipe 67 with chamber 58, as shown in Fig. 6, have the advantage of forming a trap preventing back flow of mercury into chamber 58.

In the operation of this device the displacement chamber and pipe 67 may be filled with oil or mercury and the beam balanced as before. When balanced, the mercury level in tube 72 will coincide with a zero graduation on the tube. Pressure is then admitted to chamber 3 as before to raise the pointer 45 above the horizontal graduation of scale 51. At the same time oil or mercury is displaced from chamber 58 because of the expansion of bellows 57 due to the upward movement of post 9 and its extension 9'. Liquid displaced from the chamber is forced into pipe 67 and displaces mercury from chamber 74 into glass tube 72. Weights are then placed on the scale pan until the beam is nearly balanced and becomes suspended free of the stops 55 and 56. At this time the pressure measured will be represented by the sum of the weights on the scale pan plus or minus the weight of the column of mercury as indicated by the position of the mercury level above or below the zero mark in tube 72. The use of the column of mercury makes it possible to use a large scale for indicating relatively small variations of pressure and this materially increases the precision of the gauge.

In the modification shown in Fig. 8, light spring 79 is secured to base 1 of the gauge, and to the end of beam 17, by means of screw eyes 80, and a dial indicator of well known construction is mounted with its feeler 81 resting on top of the beam. The dial indicator which reads plus and minus in terms of weight or pressure, has of course been previously calibrated in accordance with the spring with which it is to be used. With this modified construction the gauge operates substantially as before. The pressure measured is represented by the sums of the weights on the scale pan, plus or minus the pressure recorded by the dial indicator.

In either of the constructions shown in Figs. 6 and 8 it is not necessary that the beam be horizontally balanced at the time the pressure reading is obtained. It is only necessary that the beam be balanced that is, not resting on either stops 55 or 56. Both the mercury column and the dial indicator may be arranged to read plus or minus and the amount indicated is either added or subtracted from the sum of the weights on the scale beam to give the fluid pressure measured. The gauge is so sensitive and free from friction that it requires damping. This is accomplished by filling chamber 3 with oil. When relatively small pressures are measured, a large, more flexible bellows 6' (Fig. 7) is used. The bellows is suitably secured to the top of the pressure chamber by welding, brazing or bolting or the like.

Instead of connecting the mercury column 72 with the displacement chamber 58 through pipe 67, it may be mounted directly on top of the displacement chamber. Such construction is shown in Fig. 9 of the drawings. In this desirable arrangement the T pipe connection, pipe 67 and mercury reservoir 74 are dispensed with and the glass mercury tube 72 and metal collar 68 are mounted directly on top of the displacement chamber 58.

The gauge herein provided is of simple construction, cheap to manufacture and rugged and durable in use. It is well suited for use as a standard test gauge and has a sensitivity of about one part in six to eight thousand parts.

What I claim is:

1. A fluid pressure gauge comprising a chamber adapted to receive fluid the pressure of which is to be measured and a displacement chamber filled with liquid, said displacement chamber being mounted on top of said pressure chamber, bellows in each of said chambers, one end of each of said bellows being fixed and open to the atmosphere and the other end being movable and secured to opposite ends of a movement post, a scale beam fulcrumed on top of said pressure chamber and connected for movement with said movement post, and a mercury column connected to said displacement chamber, the height of the mercury in said column being an indication of pressure displacements of said beam.

2. In a fluid gauge having a movement post actuated by the pressure to be measured and a scale beam carried on said post, means for indicating small pressure displacements of the beam comprising a fluid containing displacement chamber having means actuated by the movement post for displacing fluid from said chamber, a mercury reservoir connected to said chamber and a vertical relatively small bored graduated tube adapted to receive mercury from said reservoir.

3. A fluid pressure gauge comprising a chamber adapted to receive fluid the pressure of which is to be determined, a pressure responsive bellows positioned in said chamber, one end of said bellows being fixed and open to the atmosphere, the other end being movable and carrying a movement post, a scale beam adapted to be actuated by the movement post a weight pan carried by said beam and means for measuring small pressure displacements of said beam, said means comprising a displacement chamber containing fluid mounted above said beam, a bellows in the displacement chamber, said bellows being adapted to be actuated by a movement post connected to said beam and a column containing mercury mounted in communication with said displacement chamber, said mercury column being adapted to measure said small displacements of the scale beam.

4. In a scale beam type of fluid pressure gauge, a movement post, a pressure responsive bellows connected to each end of said movement post, one of said bellows being disposed in a chamber adapted to receive fluid the pressure of which is to be measured, the other of said bellows being disposed in a displacement chamber containing mercury, a vertically disposed tube connected with said displacement chamber for reception of mercury displaced therefrom and a scale beam adapted to be actuated by said movement post and to receive weights at one end.

5. A fluid pressure gauge comprising a chamber adapted to receive fluid the pressure of which is to be measured and a displacement chamber containing mercury, said displacement chamber being mounted on top of said pressure chamber, bellows in each of said chambers, one end of each of said bellows being fixed and open to the atmosphere and the other ends being movable and secured to opposite ends of a rigid movement post, a scale beam fulcrumed on top of said pressure chamber between said pressure chamber and said displacement chamber, and connected for movement with said movement post, and a mercury column connected to said displacement chamber, the weight of the mercury in said column being transmitted through fluid in said displacement chamber to said bellows and thence by means of the movement post to the beam, the height of the mercury in said column being an indication of small pressure displacements of said beam.

6. A fluid pressure test gauge comprising a pressure chamber adapted to receive fluid the pressure of which is to be measured, a pressure responsive bellows positioned in said chamber, one end of said bellows being fixed and open to the atmosphere, the other end being closed and free to move in the chamber, fluid pressure being applied to the outside of the bellows, a movement post carried on the closed bellows end, means engaging the movement post and supporting the movement post allowing straight line motion, a balanced scale beam, a fulcrum support of the frictionless type for the scale beam, said support comprising a flexible member of small thickness carrying the beam, connecting means of the frictionless type operably connecting the movement post and the beam, said connecting means comprising a flexible member of small thickness, means for balancing said beam against pressure upon the bellows and indicating means reflecting motion of the movement post.

7. The gauge of claim 6 wherein the balancing means comprise weights positioned on the beam so as to tend to move it in a direction opposite to that of the motion imparted by the movement post.

8. The gauge of claim 6 wherein the balancing means comprise a spring bearing upon the beam and opposing pressure displacements thereof and a calibrated dial indicator actuated by the beam for measuring pressure displacements of the beam.

9. The apparatus of claim 6 wherein the movement post connecting means divides the beam into a long and a short arm, the fixed supporting fulcrum being on the short arm and an adjustable weight is provided on the short arm for counterbalancing the weight of the long arm.

10. The gauge of claim 6 wherein a displacement chamber filled with liquid is provided containing a bellows adapted to be actuated by the movement post, the displacement chamber being connected to a tube containing a column of liquid of a height varying in direct proportion to the displacement of the scale beam from its zero position.

11. A fluid pressure test gauge comprising a pressure chamber adapted to receive fluid the pressure of which is to be determined, a pressure responsive bellows positioned in said chamber, one end of said bellows being fixed and open to the atmosphere, the other end being closed and free to move in the chamber, fluid pressure being applied to the outside of the bellows, a movement post carried on the closed bellows end, fulcrum tape means for frictionlessly supporting the movement post allowing straight line motion, a balanced scale beam, a fulcrum tape support for the scale beam, a fulcrum tape operatively connecting the beam with the movement post, means for adjusting the connection between the fulcrum tape and the movement post whereby the beam may be brought to zero position and means independent of said zero setting means for balancing said beam against pressure upon the bellows and indicating means reflecting motion of the movement post.

12. A fluid pressure test gauge comprising a pressure chamber adapted to receive fluid the pressure of which is to be measured, a pressure responsive bellows positioned in said chamber, one end of said bellows being fixed and open to the atmosphere, the other end being closed and free to move in the chamber, fluid pressure being applied to the outside of the bellows, a movement post carried on the bellows end, a balanced scale beam, a fulcrum tape support for the scale beam, a fulcrum tape operatively connecting the movement post and the beam at a point closely adjacent the fulcrum tape support, a fulcrum tape frictionlessly supporting the movement post to allow straight line motion, means for balancing said beam against pressure upon the bellows and indicating means cooperating with the long arm of the scale beam and reflecting in magnified movement the motion of the movement post.

REGINALD J. S. PIGOTT.